(12) United States Patent  
Schmiedl et al.

(10) Patent No.: US 6,930,179 B2
(45) Date of Patent: Aug. 16, 2005

(54) METHOD FOR THE TRICHROMATIC DYEING OR PRINTING OF SYNTHETIC POLYAMIDE FIBER MATERIALS

(75) Inventors: Jürgen Schmiedl, Steinen (DE); Klaus Koch, Muttenz (CH); Wolfgang Mundle, Weil am Rhein (DE); Franz Grüner, Schopfheim (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/847,096

(22) Filed: May 17, 2004

(65) Prior Publication Data

US 2004/0211013 A1 Oct. 28, 2004

Related U.S. Application Data

(62) Division of application No. 10/192,092, filed on Jul. 10, 2002, now abandoned.

(30) Foreign Application Priority Data

Jul. 12, 2001 (CH) .............................................. 1279/01
Oct. 30, 2001 (CH) .............................................. 1987/01

(51) Int. Cl.[7] ............................ C09B 62/51; D06P 3/24
(52) U.S. Cl. ......................................... 534/638; 8/549
(58) Field of Search .............................. 534/638; 8/549

(56) References Cited

U.S. PATENT DOCUMENTS

| | | | | |
|---|---|---|---|---|
| 4,191,687 A | | 3/1980 | Austin .......................... | 260/153 |
| 4,837,310 A | | 6/1989 | Morimitsu et al. .......... | 534/638 |
| 5,541,301 A | * | 7/1996 | Jordine et al. ............... | 534/635 |
| 5,760,194 A | | 6/1998 | Lehmann et al. ........... | 534/636 |
| 5,760,195 A | | 6/1998 | Lehmann et al. ........... | 534/638 |
| 5,779,740 A | | 7/1998 | Lehmann et al. ............ | 8/549 |
| 5,958,086 A | | 9/1999 | Adam et al. .................. | 8/641 |
| 6,063,137 A | | 5/2000 | Scheibli et al. .............. | 8/549 |
| 6,114,511 A | * | 9/2000 | Dannheim .................... | 534/633 |
| 6,241,789 B1 | | 6/2001 | Scheibli et al. .............. | 8/682 |
| 6,815,536 B2 | * | 11/2004 | Huang et al. ................ | 534/612 |
| 2001/0013149 A1 | | 8/2001 | Scheibli et al. .............. | 8/543 |

OTHER PUBLICATIONS

Chem. Abstr. 98:217159s for JP 57–199877 (1982).

* cited by examiner

Primary Examiner—Fiona T. Powers
(74) Attorney, Agent, or Firm—Kevin T. Mansfield

(57) ABSTRACT

Method for the trichromatic dyeing or printing of synthetic polyamide fiber material, wherein at least one red reactive dye of formula

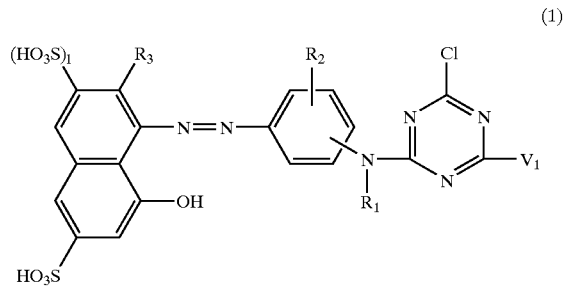

is used together with at least one of the yellow or orange reactive dyes of formulae

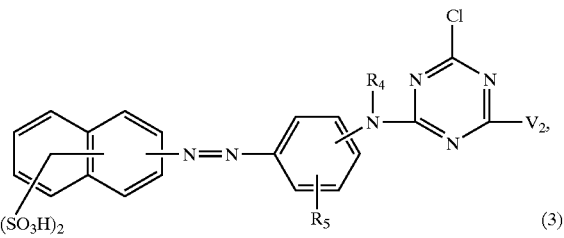

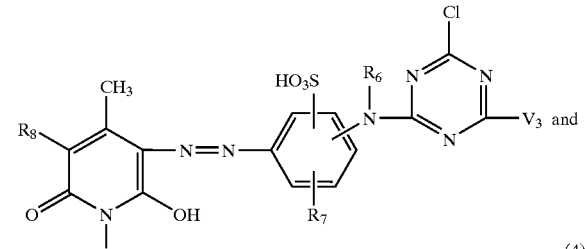

and at least one blue reactive dye of formula

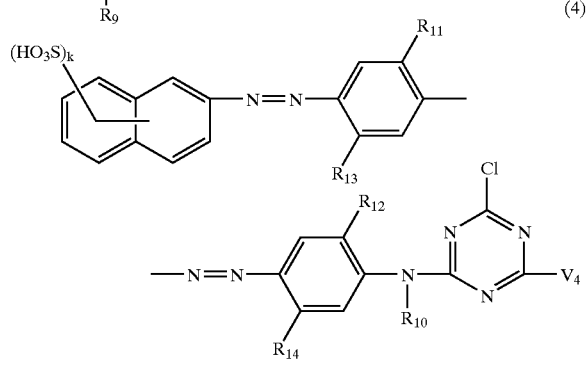

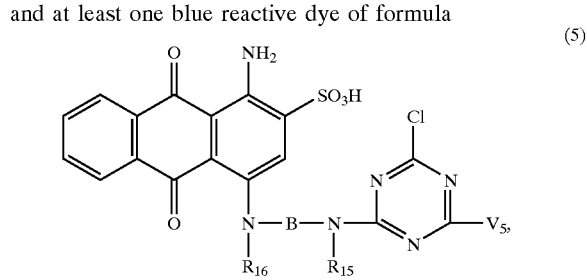

in which formulae
the variables are as defined in claim 1,
which method is distinguished by a uniform color build-up and a very good combinability.

7 Claims, No Drawings

METHOD FOR THE TRICHROMATIC DYEING OR PRINTING OF SYNTHETIC POLYAMIDE FIBER MATERIALS

This application is a divisional of application Ser. No. 10/192,092, filed Jul. 10, 2002, now abandoned.

The present invention relates to a method of trichromatic dyeing or printing and to the red reactive dyes especially suitable for that purpose.

The problem underlying the present invention was to find a method of dyeing or printing synthetic polyamide fibre materials, for example woven carpet fabrics, using reactive dyes suitable for combination according to the trichromatic principle.

It has now been found that the problem can be solved according to the invention by the method described hereinbelow. The dyeings so obtained meet the set objectives in a special manner. The dyeings obtained are distinguished especially by uniform colour build-up and, at the same time, constancy of shade at different concentrations, and by good combinability, and exhibit good fibre levelness and no dichroism.

The present invention accordingly relates to a method for the trichromatic dyeing or printing of synthetic polyamide fibre material in which at least one red reactive dye of formula

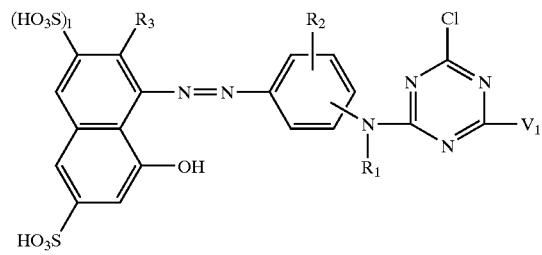

(1)

is used together with at least one of the yellow or orange reactive dyes of formulae

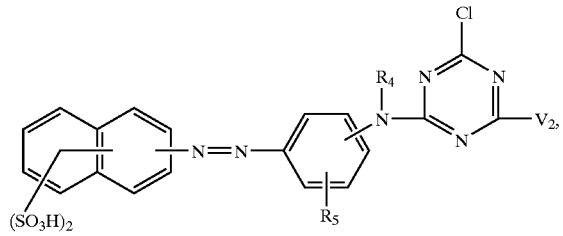

(2)

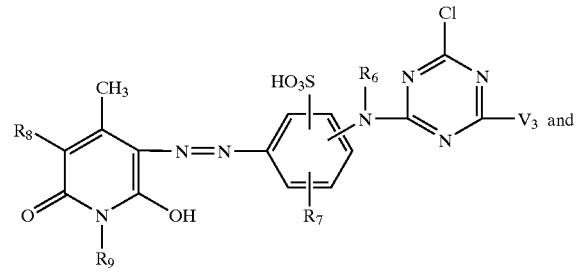

(3) and

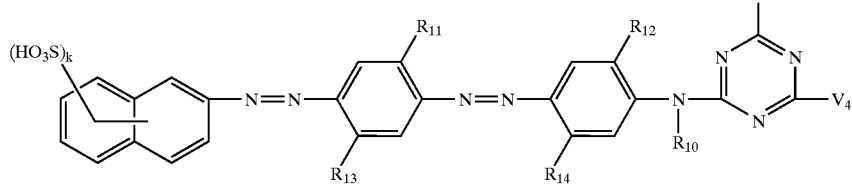

(4)

and at least one blue reactive dye of formula

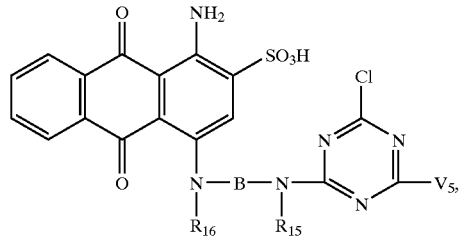

(5)

in which formulae $R_1$, $R_4$, $R_6$, $R_{10}$, $R_{15}$ and $R_{16}$ are each independently of the others hydrogen, or $C_1$–$C_4$alkyl unsubstituted or substituted by hydroxy, sulfo, sulfato, carboxy or by cyano, $R_2$, $R_5$, $R_7$, $R_{13}$ and $R_{14}$ are each independently of the others hydrogen, $C_1$–$C_4$alkyl, $C_1$–$C_4$alkoxy, $C_2$–$C_4$alkanoylamino, ureido, sulfamoyl, halogen, sulfo or carboxy, $R_3$ is amino or N-mono- or N,N-di-$C_1$–$C_4$alkylamino, $R_8$ is hydrogen, sulfomethyl, carbamoyl or cyano, $R_9$ is $C_1$–$C_4$alkyl, $R_{11}$ and $R_{12}$ are each independently of the other hydrogen, $C_1$–$C_4$alkyl, $C_1$–$C_4$alkoxy, halogen, sulfo or carboxy, B is a $C_2$–$C_6$alkylene radical, which may be interrupted by 1, 2 or 3 —O— members and which is unsubstituted or substituted by hydroxy or by sulfato, or a cyclohexylene radical or methylene-cyclohexylene radical each of which is unsubstituted or substituted by $C_1$–$C_4$alkyl, or a phenylene or methylene-phenylene-methylene radical each of which is unsubstituted or substituted by $C_1$–$C_4$alkyl, $C_1$–$C_4$alkoxy, halogen or by sulfo, l is the number 0 or 1, k is the number 1, 2 or 3, and $V_1$ is a radical of formula $$-NH-(CH_2)_{2-3}-SO_2Z \qquad (6a),$$

$$-NH-(CH_2)_{2-3}-O-(CH_2)_{2-3}-SO_2Z \qquad (6b),$$

(6c)

$$\underset{R_{17}}{-N}-\underset{(R_{18})_m}{\bigcirc}-SO_2Z$$

or (6d)

$$\underset{R_{19}}{-N}-\underset{(SO_3H)_n}{\bigcirc}-CO-NH-(CH_2)_{2-3}-SO_2-Z,$$

in which formulae $R_{17}$ and $R_{19}$ are each independently of the other hydrogen, or $C_1$–$C_4$alkyl unsubstituted or substituted by hydroxy, sulfo, sulfato, carboxy or by cyano, $R_{18}$ is $C_1$–$C_4$alkyl, $C_1$–$C_4$alkoxy, halogen or sulfo, Z is the radical —CH=CH$_2$ or —CH$_2$—CH$_2$—Y and Y is a leaving group, m is the number 0, 1 or 2, n is the number 0 or 1, and $V_2$, $V_3$, $V_4$ und $V_5$ are each independently of the others a radical of the above-indicated formula (6a), (6b), (6c) or (6d) or a radical of formula (6e)

$$\underset{R_{20}}{-N}-\underset{(SO_3H)_{0-1}}{\bigcirc}-NH-CO-X$$

wherein $R_{20}$ is hydrogen, or $C_1$–$C_4$alkyl unsubstituted or substituted by hydroxy, sulfo, sulfato, carboxy or by cyano, and X is a radical $$-\underset{Hal}{CH}-CH_2-Hal \quad \text{or} \quad -\underset{Hal}{CH}=CH_2$$

and Hal is bromine or chlorine, with the proviso that the dye of formula (1) contains two sulfo groups.

The radicals $R_1$, $R_4$, $R_6$, $R_{10}$, $R_{15}$, $R_{16}$, $R_{17}$, $R_{19}$ and $R_{20}$ as alkyl radicals are straight-chain or branched. The alkyl radicals may in turn be substituted by hydroxy, sulfo, sulfato, cyano or by carboxy. Examples that may be mentioned are methyl, ethyl, n-propyl, isopropyl, n-butyl, isobutyl, sec-butyl and tert-butyl, and the corresponding radicals substituted by hydroxy, sulfo, sulfato, cyano or by carboxy. Preferred substituents are hydroxy, sulfo or sulfato, especially hydroxy or sulfato and more especially hydroxy.

According to one interesting embodiment, when B is a $C_2$–$C_6$alkylene radical that may be interrupted by 1, 2 or 3 —O— members and is unsubstituted or substituted by hydroxy or by sulfato, one of the radicals $R_{15}$ and $R_{16}$ is $C_1$–$C_4$alkyl substituted by hydroxy, sulfo, sulfato, cyano or by carboxy and the other of the radicals $R_{15}$ and $R_{16}$ is hydrogen or $C_1$–$C_4$alkyl, especially hydrogen.

$C_1$–$C_4$Alkyl radicals that come into consideration for $R_2$, $R_5$, $R_7$, $R_{11}$, $R_{12}$, $R_{13}$, $R_{14}$ and $R_{18}$, each independently of the others, are, for example, methyl, ethyl, n-propyl, isopropyl, n-butyl, sec-butyl, tert-butyl and isobutyl, preferably methyl and ethyl and especially methyl.

$R_9$ as $C_1$–$C_4$alkyl is, for example, methyl, ethyl, n-propyl, isopropyl, n-butyl, sec-butyl, tert-butyl or isobutyl, preferably methyl or ethyl and especially ethyl.

$C_1$–$C_4$Alkoxy radicals that come into consideration for $R_2$, $R_5$, $R_7$, $R_{11}$, $R_{12}$, $R_{13}$, $R_{14}$ and $R_{18}$, each independently of the others, are, for example, methoxy, ethoxy, propoxy, isopropoxy, n-butoxy, sec-butoxy, tert-butoxy and isobutoxy, preferably methoxy and ethoxy, and especially methoxy.

$C_2$–$C_4$Alkanoylamino radicals that come into consideration for $R_2$, $R_5$, $R_7$, $R_{13}$ and $R_{14}$, each independently of the others, are, for example, acetylamino and propionylamino and especially acetylamino.

Halogen atoms that come into consideration for $R_2$, $R_5$, $R_7$, $R_{11}$, $R_{12}$, $R_{13}$, $R_{14}$ and $R_{18}$, each independently of the others, are, for example, fluorine, chlorine and bromine, preferably chlorine and bromine, and especially chlorine.

N-mono- and N,N-di-$C_1$–$C_4$alkylamino radicals that come into consideration for $R_3$, are, for example, methylamino, ethylamino, n-propylamino, n-butylamino, N,N-dimethylamino and N,N-diethylamino, preferably methylamino, ethylamino, N,N-dimethylamino and N,N-diethylamino, and especially methylamino, ethylamino and N,N-dimethylamino.

For B denoting a cyclohexylene radical or methylene-cyclohexylene radical each of which is unsubstituted or substituted by $C_1$–$C_4$alkyl, or denoting a phenylene or methylene-phenylene-methylene radical each of which is unsubstituted or substituted by $C_1$–$C_4$alkyl, $C_1$–$C_4$alkoxy, halogen or by sulfo, there come into consideration as $C_1$–$C_4$alkyl, $C_1$–$C_4$alkoxy and halogen, for example, the radicals and their preferred meanings indicated above for $R_2$, $R_5$, $R_7$, $R_{11}$, $R_{12}$, $R_{13}$, $R_{14}$ and $R_{18}$.

The leaving group Y is, for example —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$. Y is preferably a group of formula —Cl, —OSO$_3$H, —SSO$_3$H, —OCO—CH$_3$, —OCO—C$_6$H$_5$ or —OPO$_3$H$_2$, especially —Cl, —OSO$_3$H or —OCO—CH$_3$ and more especially —Cl or —OSO$_3$H.

$R_1$, $R_4$, $R_6$, $R_{10}$, $R_{15}$, $R_{16}$, $R_{17}$, $R_{19}$ and $R_{20}$ are preferably, each independently of the others, hydrogen or $C_1$–$C_4$alkyl, especially hydrogen, methyl or ethyl.

$R_1$, $R_4$, $R_6$, $R_{10}$, $R_{15}$, $R_{16}$, $R_{17}$, $R_{19}$ and $R_{20}$ are especially preferably hydrogen.

Preferably, $R_2$, $R_5$, $R_7$, $R_{13}$ and $R_{14}$ are each independently of the others hydrogen, $C_1$–$C_4$alkyl, $C_1$–$C_4$alkoxy, $C_2$–$C_4$alkanoylamino, ureido, sulfo or carboxy, especially hydrogen, $C_1$–$C_4$alkyl, $C_1$–$C_4$alkoxy, $C_2$–$C_4$alkanoylamino, ureido or sulfo, and $R_{11}$ and $R_{12}$ are each independently of the other hydrogen, $C_1$–$C_4$alkyl, $C_1$–$C_4$alkoxy or sulfo, especially hydrogen, $C_1$–$C_4$alkyl or $C_1$–$C_4$alkoxy.

Especially preferably, $R_2$ is sulfo, $R_5$ is ureido or $C_2$–$C_4$alkanoylamino, especially ureido, and $R_7$, $R_{11}$, $R_{12}$, $R_{13}$ and $R_{14}$ are hydrogen.

$R_3$ is preferably amino.

$R_8$ is preferably hydrogen, sulfomethyl or carbamoyl, especially hydrogen or sulfomethyl and more especially hydrogen.

B is preferably a $C_2$–$C_6$alkylene radical, a methylene-cyclohexylene radical unsubstituted or substituted by $C_1$–$C_4$alkyl, or a phenylene or methylene-phenylene-methylene radical each of which is unsubstituted or substituted by $C_1$–$C_4$alkyl, $C_1$–$C_4$alkoxy, halogen or by sulfo.

B is especially preferably a radical of formula

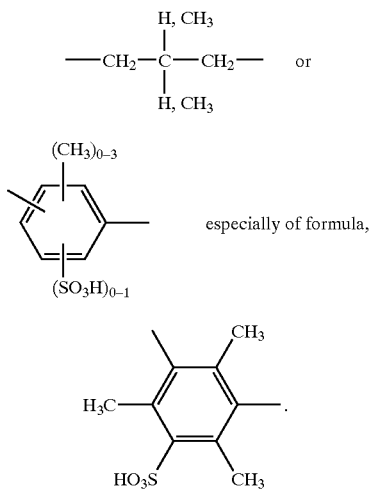

$R_{18}$ is preferably methyl, methoxy or sulfo, especially methyl or methoxy.

Z is preferably the radical —CH=CH$_2$.

$V_1$, $V_2$, $V_3$, $V_4$ und $V_5$ are preferably, each independently of the others, a radical of formula (6c) or (6d), wherein $R_{17}$, $R_{18}$, $R_{19}$, Z, m und n have the meanings and preferred meanings indicated above.

l is preferably the number 0.

k is preferably the number 2 or 3, especially 3.

A suitable naphthyl radical in the dye of formula (4) is preferably a radical of formula

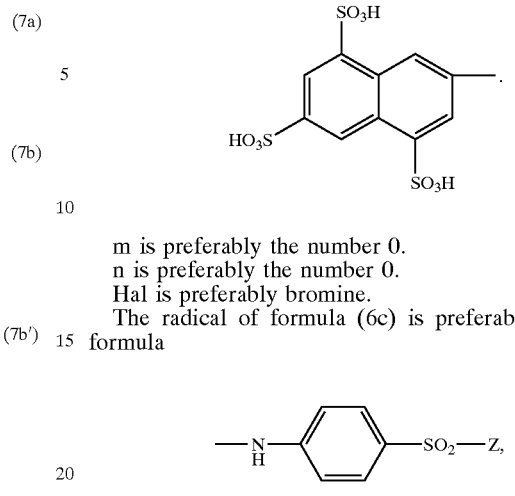

m is preferably the number 0.
n is preferably the number 0.
Hal is preferably bromine.
The radical of formula (6c) is preferably a radical of formula

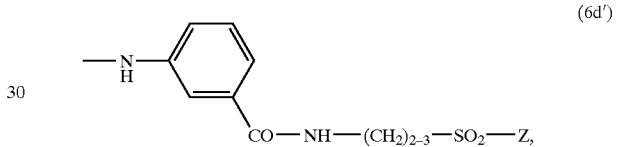

wherein Z has the meanings and preferred meanings given above.

The radical of formula (6d) ist preferably a radical of formula

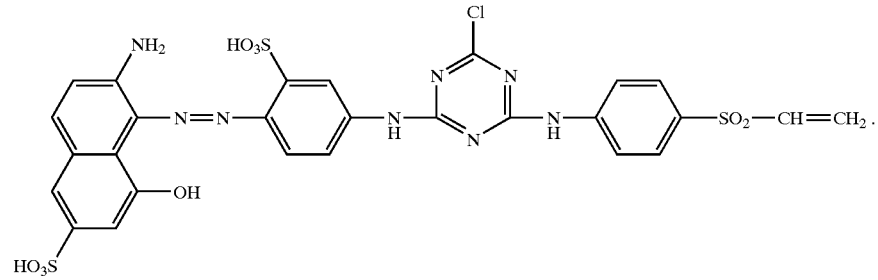

wherein Z has the meanings and preferred meanings given above.

Preference is given to the method according to the invention in which, in the reactive dye of formula (1), $R_1$ is hydrogen, $R_2$ is sulfo, $R_3$ is amino, l is the number 0 and $V_1$ is a radical of formula (6c) wherein $R_{17}$ is hydrogen, Z is vinyl and m is the number 0.

Special preference is given to the method according to the invention in which the reactive dye of formula (1) is a reactive dye Preference is given to the method according to the invention in which, in the reactive dye of formula (2), $R_4$ is hydrogen, $R_5$ is ureido and $V_2$ is a radical of formula (6c) wherein $R_{17}$ is hydrogen, Z is vinyl and m is the number 0.

Preference is given to the method according to the invention in which, in the reactive dye of formula (3), $R_6$, $R_7$ and $R_8$ are hydrogen, $R_9$ is ethyl and $V_3$ is a radical of formula (6c) wherein $R_{17}$ is hydrogen, Z is vinyl and m is the number 0.-

Preference is given to the method according to the invention in which, in the reactive dye of formula (4), $R_{10}$, $R_{11}$, $R_{12}$, $R_{13}$ and $R_{14}$ are hydrogen, $V_4$ is a radical of formula (6d) wherein $R_{19}$ is hydrogen, Z is vinyl and n is the number 0, and k is the number 3.

Preference is given to the method according to the invention in which, in the reactive dye of formula (5), $R_{15}$ and $R_{16}$ are hydrogen, B is a radical of the above formula (7a) or (7b), preferably of formula (7b), and $V_5$ is a radical of formula (6d) wherein $R_{19}$ is hydrogen, Z is vinyl and n is the number 0.

A suitable yellow or orange reactive dye for the method according to the invention is preferably a dye of formula (3) or (4), especially of formula (4), in which the variables have the meanings and preferred meanings indicated hereinabove.

The reactive dyes of formulae (1), (2), (3), (4) and (5) are known or can be prepared in analogy to known compounds.

The present invention relates also to the novel reactive dyes of formula

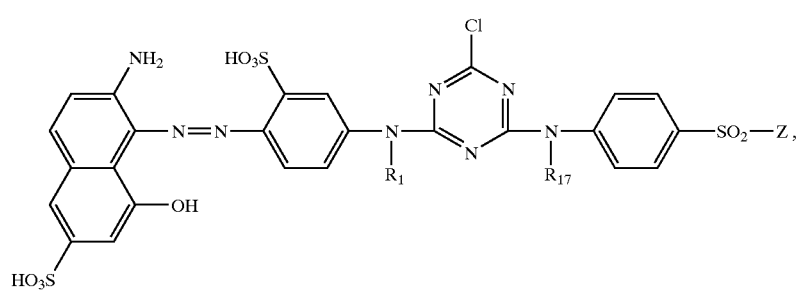

(1b)

wherein $R_1$, $R_{17}$ and Z have the meanings and preferred meanings indicated hereinabove.

The reactive dye of formula (1b) is obtained, for example, by reacting the compounds of formulae

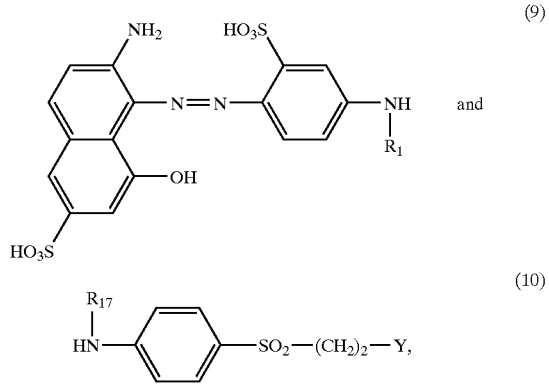

in which formulae $R_1$, $R_{17}$ and Y have the meanings and preferred meanings given hereinabove and Y is especially sulfato, with cyanuric chloride, followed, where appropriate, by an elimination reaction.

The individual process steps indicated above can be carried out in different orders or, in some instances, simultaneously, and so various process variants are possible. The reaction is generally carried out stepwise, the order in which the single reactions between the individual reaction components are carried out advantageously being geared to the particular conditions. For example, a compound of formula (9) is reacted with cyanuric chloride and the resulting product is then condensed with a compound of formula (10). Preferably, a compound of formula (10) is reacted with cyanuric chloride and the resulting product is then condensed with a compound of formula (9).

The individual condensation reactions are carried out, for example, according to methods known per se, usually in aqueous solution, at a temperature of, for example, from 0 to 50° C., especially from 0 to 10° C., and a pH value of, for example, from 3 to 10, especially from 3 to 7.

In addition, an elimination reaction may be carried out after the synthesis. For example, reactive dyes of formula (1b) that contain sulfatoethylsulfonyl radicals can be treated with a base, for example sodium hydroxide, the sulfatoethylsulfonyl radicals being converted into vinylsulfonyl radicals.

The compounds of formulae (9) and (10) are known or can be prepared in analogy to known compounds.

The reactive dyes used in the trichromatic dyeing or printing method according to the invention and the reactive dyes of formula (1b) according to the invention are present either in their free sulfonic acid form or, preferably, in the form of a salt thereof.

Suitable salts are, for example, alkali metal, alkaline earth metal or ammonium salts or salts of an organic amine. Examples that may be mentioned are sodium, lithium, potassium or ammonium salts or a mono-, di- or triethanolamine salt.

The reactive dyes used in the method according to the invention and the reactive dyes of formula (1b) according to the invention may comprise further additives, for example sodium chloride or dextrin.

The trichromatic dyeing or printing method according to the invention and the reactive dyes of formula (1b) according to the invention can be utilised in the customary dyeing and printing methods. The dye liquors or printing pastes, in addition to comprising water and the dyes, may comprise further additives, for example wetting agents, antifoams, levelling agents or agents that influence the characteristics of the textile material, for example softeners, flame-retardant additives, or dirt-, water- and oil-repellents, and also water-softeners and natural or synthetic thickeners, for example alginates and cellulose ethers.

The amounts in which the individual dyes are used in the dye baths or printing pastes can vary within wide limits depending on the required depth of shade; in general, amounts of from 0.01 to 15% by weight, especially from 0.1 to 10% by weight, based on the material to be dyed and the printing paste have proved to be advantageous.

In the case of woven carpet fabrics, printing methods such as, for example, displacement printing or space dyeing are important.

Preference is given to dyeing, which is carried out especially by the exhaust process and, in the case of carpet dyeing, can also be carried out in accordance with the continuous process.

Dyeing is preferably carried out at a pH of from 2 to 7, especially from 2.5 to 5.5 and more especially from 2.5 to 4. The liquor ratio can be selected within a wide range, for example from 1:5 to 1:50, preferably from 1:5 to 1:30. Dyeing is preferably carried out at a temperature of from 80 to 130° C., especially from 85 to 120° C.

To increase the fastness to wetting properties, any unfixed dye can be removed by an aftertreatment at a pH value of, for example, from 7 to 12, especially from 7 to 9, and at a temperature of, for example, from 30 to 100° C., especially from 50 to 80° C. Advantageously, in the case of intense colour shades, for example very deep dyeings, especially on fibre blends, the unfixed dye can be removed reductively by the addition of a reducing agent, for example hydrosulfite, such as sodium hydrosulfite, to the alkaline aftertreatment bath. The dye fixed in the polyamide fibre material is not affected by the treatment. The reducing agent is advantageously added in an amount of, for example, from 0.1 to 6% by weight, especially from 0.5 to 5% by weight, based on the weight of the aftertreatment bath.

When employed in trichromatic dyeing or printing, the reactive dyes used in the method according to the invention and the reactive dyes of formula (1b) according to the invention are distinguished by uniform colour build-up, good pick-up and fixing characteristics, good constancy of shade even at different concentrations, good fastness properties and, especially, by very good combinability.

The trichromatic method according to the invention and the reactive dyes of formula (1b) according to the invention are suitable for dyeing or printing synthetic polyamide fibre materials, such as, for example, polyamide 6 (poly-ε-caprolactam), polyamide 6.6 (polyhexamethyleneadipic amide), polyamide 7, polyamide 6.12 (polyhexamethylene-dodecanoic amide), polyamide 11 or polyamide 12, copolyamides with polyamide 6.6 or polyamide 6, for example polymers of hexamethylenediamine, ε-caprolactam and adipic acid and polymers of adipic acid, hexamethylenediamine and isophthalic acid or of adipic acid, hexamethylenediamine and 2-methylpentamethylenediamine or 2-ethyltetramethylenediamine, and are also suitable for dyeing or printing blended fabrics or yarns of synthetic polyamide and wool.

The method according to the invention and the reactive dyes according to the invention are advantageously also suitable for dyeing or printing microfibres of synthetic polyamides. Microfibres are to be understood as fibre materials that are composed of threads having an individual thread fineness of less than 1 denier (1.1 dTex). Such microfibres are known and are usually produced by melt-spinning The reactive dyes of formula (1b) according to the invention are also suitable for dyeing or printing natural polyamide fibre materials, for example wool or silk, especially wool and wool having a machine-wash-resistant finish.

The dyeing or printing of synthetic polyamide fibre materials is preferred.

The said textile material can be in a very wide variety of processing forms, for example in the form of fibres, yarn, woven fabric, knitted fabric and in the form of carpets.

Level dyeings having good all-round fastness properties, especially good fastness to rubbing, to wetting, to wet rubbing and to light, are obtained.

In the Examples that follow, parts indicate parts by weight. The temperatures are in degrees Celsius. The relationship between parts by weight and parts by volume is the same as that between grams and cubic centimetres.

PREPARATION EXAMPLE 1 a) 7 parts of a compound that in free acid form corresponds to formula

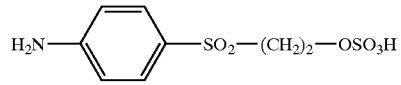

are stirred in 100 parts of water, adjusted to pH 6 by the addition of 0.35 part of Na$_2$HPO$_4$.12H$_2$O and cooled to a temperature of 0° C. A solution of 4.85 parts of cyanuric chloride and 50 parts of acetone is added dropwise in the course of from 10 to 15 minutes to the suspension so obtained, the pH being maintained at 3 by the addition of aqueous sodium hydroxide solution. Stirring is then carried out for one hour at a temperature of from 0 to 2° C. and a pH value of 3. After the addition of sodium chloride, stirring is continued for a further hour.

b) 7.5 parts of a compound that in free acid form corresponds to formula

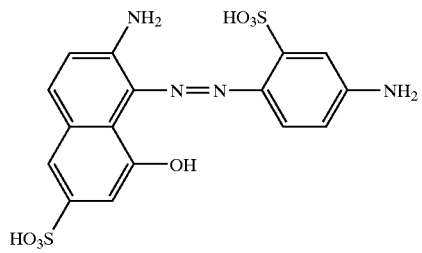

are dissolved in 100 parts of water and 11.1 parts of 1N sodium hydroxide solution at room temperature and a pH value of 5.5. The resulting solution is then added dropwise in the course of 45 minutes to the solution obtained according to a). During the addition, the pH is maintained at a value of from 5.8 to 6 by the addition of aqueous sodium hydrogen carbonate solution. Stirring is carried out for 90 minutes at room temperature and a pH value of from 5.8 to 6. The dye is then filtered off, subsequently washed with aqueous 10% sodium chloride solution and dried at a temperature of from 30 to 35° C.

c) In order to convert the dye obtained according to b) into the vinylsulfone form, an aqueous solution of the dye is adjusted to pH 10 using trisodium phosphate and stirred for 30 minutes at room temperature. The pH is monitored continuously and corrected where necessary. The end of the reaction is indicated when the pH remains constant. A dye is obtained that in free acid form corresponds to the compound of formula

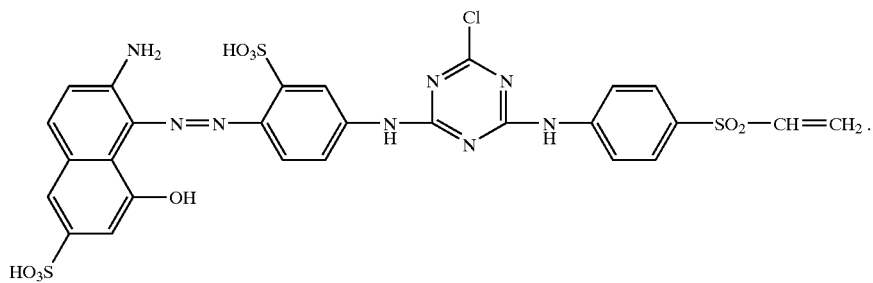
(101)
The dye of formula (101) dyes wool, silk and synthetic polyamide fibre material in red colour shades.
METHOD EXAMPLE 1
A polyamide 6.6 woven carpet fabric is continuously dyed from a dyebath containing, per 1000 parts of dye bath,
0.28 part of the red dye of formula
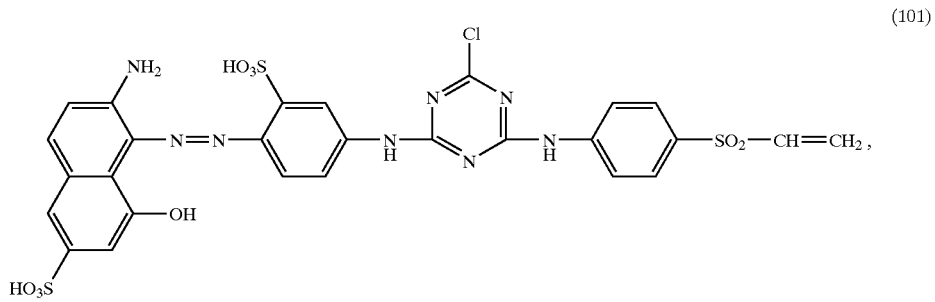
(101)
0.8 part of the yellow dye of formula
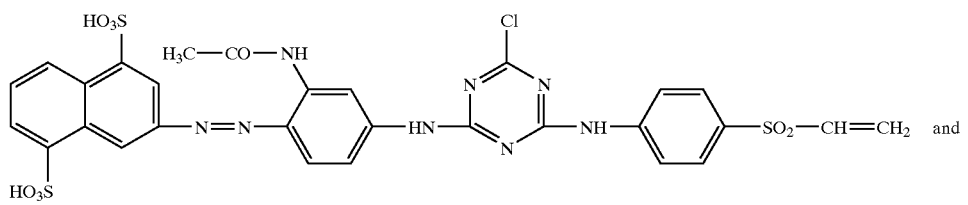
(102)
and 0.46 part of the blue dye of formula
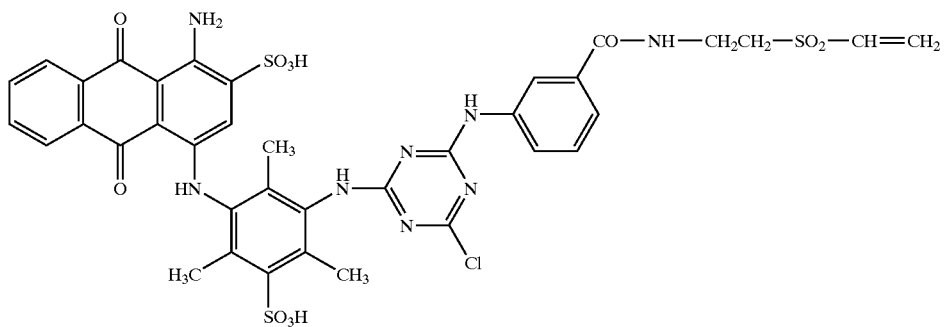
(103)

and also 1.0 part of a customary commercial thickener, 3.0 parts of a customary commercial antifreeze, 1.0 part of a non-ionic wetting agent, and sufficient citric acid to render the dye bath pH 5.5. The woven carpet fabric is then fixed in steam for 5 minutes at 100° C., washed in the usual manner and dried. The woven carpet fabric is distinguished by a uniform dark-brown dyeing having good fastness properties.

METHOD EXAMPLE 2 AND 3

By proceeding as indicated in Example 1 but, instead of using 0.28 part of the red dye of formula (101), 0.8 part of the yellow dye of formula (102) and 0.46 part of the blue dye of formula (103), using the reactive dyes indicated in column 2 of the following Table 1 in the amounts specified therein, there are likewise obtained brown dyeings that are distinguished by good levelness and good fastness properties.

l of liquor containing 3 kg of formic acid, 0.4 kg of wetting agent and 0.7 kg of a levelling agent. The pH of the liquor is 2.9. Subsequently, 700 g of the dye of formula (102), 1300 g of the dye of formula (101) and 430 g of the dye of formula (103), predissolved in a small amount of water, are added. The material to be dyed is treated for 5 min. at 40° C. in the dyeing liquor and then heated to 110° C. at a rate of 1° C./min. and dyed at that temperature for 60 min. After the dyeing, an alkaline aftertreatment is carried out to improve fastness to wetting properties. For that purpose, using a fresh bath containing 2 g/l of sodium carbonate and having a pH of 9.2, the dyeing is treated for 20 min. at 60° C. The dyeing is then rinsed and finished in the usual manner. A level dyeing having excellent fastness properties is obtained.

METHOD EXAMPLE 5

The procedure is as described in Method Example 4, except that the alkaline aftertreatment is carried out at 70° C. instead of at 60° C.

TABLE 1

| Ex. | Dye |
|---|---|
| 2 | 0.45 part of the red dye of formula (101), 0.40 part of the blue dye of formula (103) and 0.70 part of the yellow dye of formula (104) |
| 3 | 0.45 part of the red dye of formula (101), 0.40 part of the blue dye of formula (103) and 0.42 part of the yellow dye of formula (105) |

METHOD EXAMPLE 3

100 kg of texturised polyamide 6.6 tricot are treated in a dyeing apparatus for 10 min. at 40° C. with 2000 l of liquor containing 4 kg of acetic acid, 0.5 kg of wetting agent and 1 kg of a levelling agent. The pH of the liquor is 3.4. Subsequently, 430 g of the dye of formula (102), 300 g of the dye of formula (101) and 330 g of the dye of formula (103), predissolved in a small amount of water, are added. The material to be dyed is treated for 5 min. at 40° C. in the dyeing liquor and then heated to 98° C. at a rate of 1° C./min. and dyed at that temperature for 60 min. The dyeing is finished in the usual manner. A level dyeing having very good fastness properties is obtained

METHOD EXAMPLE 4

70 kg of a woven fabric of polyamide 6.6 microfibres are treated in a dyeing apparatus for 10 min. at 40° C. with 1500

METHOD EXAMPLE 6

The procedure is as described in Method Example 4, except that the alkaline aftertreatment is carried out in a bath containing 5 g/l of sodium carbonate and 5 g/l of hydrosulfite. The dyeing is treated with that bath for 20 min. at 70° C.

METHOD EXAMPLE 7 (SPACE DYEING)

A carpet of polyamide 6 yarn is first of all pad-dyed with a liquor containing, per 1000 parts of liquor, the following components:

0.01 part of the yellow dye of formula (102)
0.003 part of the red dye of formula (101),
0.008 part of the blue dye of formula (103),
3.00 parts of a customary commercial thickener,
2.00 parts of a customary commercial non-ionic wetting agent, 1.00 part of a customary commercial antifreeze, the pH being adjusted to 5 using the required amount of citric acid.

Parts of the dyed carpet are then printed with a printing paste containing, per 1000 parts of printing paste, the following components:

0.50 part of the red dye of formula (101), 0.50 part of the blue dye of formula (103), 15.0 parts of a customary commercial thickener, 2.00 parts of a customary commercial non-ionic wetting agent, 1.00 part of a customary commercial antifreeze, the pH being adjusted to 5 using the required amount of citric acid The dyed and partially printed carpet is then treated with saturated steam for 5 minutes at 100° C., washed in customary manner and dried. The carpet so obtained has, on a beige-coloured ground, red-printed areas which are distinguished by good levelness with good fastness properties.

METHOD EXAMPLE 8 (CONTINUOUS DYEING)

A carpet of polyamide 6.6 yarn is dyed continuously with a liquor containing, per 1000 parts of liquor, the following components:

0.8 part of the yellow dye of formula (102)

0.28 part of the red dye of formula (101), 0.46 part of the blue dye of formula (103), 1.00 part of a customary commercial thickener, 1.00 part of a customary commercial non-ionic wetting agent, 3.00 parts of a customary commercial antifreeze, the pH being adjusted to 5.5 using the required amount of citric acid. The dyed carpet fabric is then treated with saturated steam for 5 minutes at 100° C., washed in customary manner and dried. The carpet obtained in that manner is distinguished by a level dark-brown dyeing having very good fastness properties.

METHOD EXAMPLE 9 (DISPLACEMENT PRINTING)

A carpet of polyamide 6.6 yarn is first of all printed with various printing pastes containing the following components, some of which are in varying amounts x, y and z:

x parts of Tectilon® yellow 3R (Ciba Specialty Chemicals), y parts of Tectilon® red 2B (Ciba Specialty Chemicals), z parts of Tectilon® blue 4R-01 (Ciba Specialty Chemicals), for example x is 1.05, y is 0.34 and z is 1.01, 15.0 parts of a customary commercial thickener, 10.0 parts of Lyoprint® MP 2.00 parts of a customary commercial non-ionic wetting agent, 1.00 part of a customary commercial antifreeze, the pH being adjusted to 4 using the required amount of citric acid.

The printed carpet is then dyed with a liquor containing, per 1000 parts of liquor, the following components (the liquor pick-up is 350%):

1.26 parts of the yellow dye of formula (102)

0.62 part of the red dye of formula (101), 1.90 parts of the blue dye of formula (103), 1.00 part of a customary commercial thickener, 2.00 parts of a customary commercial non-ionic wetting agent, 2.00 parts of a customary commercial antifreeze, the pH being adjusted to 5.5 using the required amount of citric acid.

The carpet is then treated with saturated steam for 5 minutes at 100° C., washed in customary manner and dried. The carpet so obtained has, on a dark-violet ground, coloured areas which are distinguished by good levelness with good fastness properties.

What is claimed is:

1. A reactive dye of formula

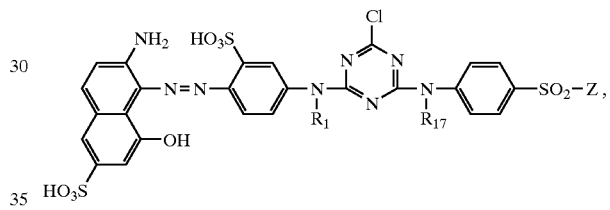

(1b)

wherein $R_1$ and $R_{17}$ are each independently of the other hydrogen, or $C_1$–$C_4$alkyl unsubstituted or substituted by hydroxy, sulfo, sulfato, carboxy or by cyano and Z is the radical —CH=$CH_2$ or —$CH_2$—$CH_2$—Y and Y is a leaving group.

2. A process for dyeing or printing natural or synthetic polyamide fibre material, which comprises applying to said fibre material a reactive dye of formula (1b) according to claim 1.

3. A process according to claim 2, for dyeing or printing synthetic polyamide fibre material.

4. A reactive dye according to claim 1, wherein $R_1$ and $R_{17}$ are each hydrogen, methyl or ethyl.

5. A reactive dye according to claim 1, wherein $R_1$ and $R_{17}$ are each hydrogen.

6. A reactive dye according to claim 1, wherein

Y is —Cl, —$OSO_3H$, —$SSO_3H$, —OCO—$CH_3$, —OCO—$C_6H_5$ or —$OPO_3H_2$.

7. A reactive dye according to claim 1, wherein

Y is —Cl or —$OSO_3H$.

* * * * *